(12) United States Patent
Bauschke et al.

(10) Patent No.: US 6,850,650 B1
(45) Date of Patent: Feb. 1, 2005

(54) SYSTEM AND METHOD FOR RECOMPRESSING A JPEG IMAGE USING REQUANTIZATION

(75) Inventors: Heinz Bauschke, Guelph (CA); Mason Macklem, Burnaby (CA); Nicholas Swart, Kelowna (CA)

(73) Assignee: Packeteer, Inc., Cupertino, CA (US)

( * ) Notice: Subject to any disclaimer, the term of this patent is extended or adjusted under 35 U.S.C. 154(b) by 635 days.

(21) Appl. No.: 10/012,138

(22) Filed: Nov. 9, 2001

Related U.S. Application Data

(60) Provisional application No. 60/294,384, filed on May 30, 2001.

(51) Int. Cl.[7] .............................. G06K 9/36; G06K 9/46
(52) U.S. Cl. ....................................... 382/251; 382/250
(58) Field of Search ................................ 382/250, 251, 382/235, 239; 375/240.03, 240.05

(56) References Cited

U.S. PATENT DOCUMENTS

| | | | |
|---|---|---|---|
| 5,629,780 A | * 5/1997 | Watson ....................... | 382/250 |
| 6,005,982 A | * 12/1999 | Abe ........................... | 382/251 |
| 6,198,848 B1 | * 3/2001 | Honma et al. .............. | 382/251 |

OTHER PUBLICATIONS

Reininger RC et al., "Distributions of the Two–Dimensional DCT Coefficients for Images," *IEEE Trans. On Comm.*, vol. COM–31, No. 6, pp. 835–839, Jun. 1983, IEEE Press.
Wallace GK et al., "The JPEG Still Picture Compression Standard," *Comm. Of the ACM*, vol. 34, No. 4, pp. 31–44, Apr. 1991, ACM Press.
Chan S, "Recompression of Still Images," *Tech, Rep.* 2–92, University of Kent, 41 pps., Mar. 1992, Kent, England.
Lam Ey et al., "A Mathematical Analysis of the DCT Coefficient Distributions for Images," *IEEE Trans. On Image Proc.*, vol. 9, No. 10, pp. 1661–1666, Oct. 2000, IEEE Press.

* cited by examiner

*Primary Examiner*—Phuoc Tran
(74) *Attorney, Agent, or Firm*—Patrick J. S. Inouye

(57) ABSTRACT

A system and method for recompressing a JPEG image using requantization is described. DCT transform coefficients for a compressed JPEG image are statistically analyzed to generate a stored numeric error representation. Local minimizers are determined from the stored numeric error representation with selective rounding. A new quantization matrix $Q_1$ is selected from the local minimizers bounded by a target quantization matrix $Q_{bound}$. The compressed JPEG image is recompressed using the new quantization matrix $Q_1$.

30 Claims, 10 Drawing Sheets

SYSTEM AND METHOD FOR RECOMPRESSING A JPEG IMAGE USING REQUANTIZATION

CROSS-REFERENCE TO RELATED APPLICATION

This patent application is a conversion of U.S. provisional application Ser. No. 60/294,384, filed May 30, 2001; pending, the priority date of which is claimed and the disclosure of which is incorporated by reference.

FIELD OF THE INVENTION

The present invention relates in general to image processing and, in particular, to a system and method for recompressing a JPEG image using requantization.

BACKGROUND OF THE INVENTION

Continuous tone still images can be stored electronically in digital form as matrices of quantized analog values. Each matrix is a two-dimensional grid of individual picture elements or "pixels." Each pixel has an integer value representing a color or grayscale tonal value on an integer-based gradient scale. For example, a single 16-bit pixel value represents one color picked from a palette consisting of 65,536 individual colors. The pixel values for each image are stored into a file representing the image rendered at a set dimension, such as 640×480 pixels.

In raw uncompressed form, the size of a digital image file increases dramatically with the size of the color palette and image dimensions. A richer color palette requires more integer values and a larger dimensioned image requires an increased number of pixels. Fortunately, digital image storage benefits from compression techniques which take advantage of repetitive or otherwise structured data and which can compress the size of a digital image file into a more manageable size. The Joint Photographic Expert Group (JPEG) file format is presently the most commonly used format for compressing photo-realistic digital image file data, and is described in G. K. Wallace, "The JPEG Still Picture Compression Standard," Comm. of the ACM (April 1991), and W. B. Pennebaker et al., "JPEG Still Image Data Compression Standard," Van Nostrad Rhinehold (1993), the disclosures of which are incorporated by reference.

Increasingly, digital images are being exchanged between interconnected networks of computer systems, including over the Internet, as well as with lightweight clients, such as personal data assistants (PDAs) and cellular telephones. Conventionally, the ability to exchange data, including digital images, over a network, is limited by the network bandwidth available to each device. The bandwidth is affected by the capability of the network itself as well as by the means by which each client is interconnected. A slow modem connection, for instance, is a form of low bandwidth connection that can restrict the ability of an individual client to exchange data. Lower bandwidth means longer download times for larger file sizes. Low bandwidth is particularly problematic when receiving digital images as content embedded, for instance, in Web pages.

One solution to the low bandwidth problem is to recompress images that are already stored in a compressed format, such as the JPEG file format, to further conserve on space and bandwidth requirements. The JPEG file format, however, is an image compression file format that is mostly used in a "lossy" version, that is, a version that loses information upon compression. As well, successive recompressions will result in additional data loss and in the formation of visual artifacts which deteriorate the perceptual quality of an image.

Moreover, the compression and recompression of images using the JPEG file format can result in unpredictable and quite surprising changes. A widely used quality scale was implemented by the Independent JPEG Group (IJG). The quality scale offers compression at predefined quality levels on a range of Q1 (very low quality) to Q100 (excellent quality). In general, higher quality levels correspond to larger file sizes. However, this quality scale is not perceptually monotone. A larger file size does not necessarily correspond to better perceptual quality. When recompressing an already once-compressed JPEG image, lower quality settings can actually result in better perceptual quality, such as described in S. Chan, "Recompression of Still Images," Tech. Rep. 2–92, Univ. of Kent, Canterbury, UK (March 1992), the disclosure of which is incorporated by reference.

In the prior art, one solution to reducing the incidence of artifacts in recompressed images originally compressed using the JPEG file format is described in the Chan article. As described therein, three test images are recompressed to various quality levels and the entry-wise quotients of the quantization matrices used during the recompression are analyzed. Chan provides heuristics to modify the transform coefficients of the image data after each requantization. Chan empirically observes favorable requantization conditions for each image, each of which appears to depend only upon the quantization matrices involved in an image-dependent manner. However, no explanation of this highly interesting phenomenon is given.

Therefore, there is a need for an approach to recompressing images compressed in the JPEG file format towards a selected target quality through the creation of a new quantization matrix that substantially minimizes the errors introduced through requantization and without requiring the iterative modification of image transform coefficients.

SUMMARY OF THE INVENTION

The present invention provides a system and method for constructing a new quantization matrix for use in recompressing images compressed in the JPEG file format. In contrast to the approach described in the Chan article, above, the quantization matrices are adjusted rather than the image coefficients. The new quantization matrix is calculated based on the desired user-specified target quantization matrix and on the quantization matrix contained in the given JPEG image. For each entry, a constant is computed as the integer quotient of the target quantization matrix and the current image quantization matrix. In case this constant is zero, the new quantizer is set equal to the current quantizer. In the non-zero case, the new quantizer is computed as the product of this constant and the old quantizer. In addition, the new quantizer is incremented by one, if the constant was even. In a further embodiment, the operation of incrementing is avoided by observing a modified rounding convention for half integers which are rounded towards zero during requantization.

An embodiment of the present invention provides a system and method for recompressing a JPEG image using requantization. The Discrete Cosine Transform (DCI) coefficients, used in the JPEG standard, as described in W. B. Pennebaker et al., "JPEG Still Image Data Compression Standard," Van Nostrad Rhinehold (1993), follow a Laplacian distribution. These coefficients are statistically analyzed to generate a stored numeric error representation. Local minimizers are determined from the stored numeric error representation. A new quantization matrix $Q_1$ is selected from the local minimizers bounded by a target quantization matrix $Q_{bound}$. The compressed JPEG image is recompressed using the new quantization matrix $Q_1$ and selective rounding.

A further embodiment provides a system and method for constructing a new quantization matrix for use in recompressing a JPEG image. An intermediate constant k is determined, computed in accordance with the equation:

$$k = \left\lfloor \frac{q_{bound}}{q_0} \right\rfloor.$$

A new quantization matrix $Q_1$, including a plurality of quantizers $q_1$, is defined from an initial quantization matrix $Q_0$, including a plurality of quantizers $q_0$. Each such quantizer $q_1$ is computed in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases}$$

A JPEG image is recompressed using the new quantization matrix $Q_1$.

A further embodiment provides a system and method for constructing a new quantization matrix for use in recompressing a JPEG image with selective rounding. An intermediate constant k is determined, computed in accordance with the equation:

$$k = \left\lfloor \frac{q_{bound}}{q_0} \right\rfloor.$$

A new quantization matrix $Q_1$ including a plurality of quantizers $q_1$, is defined from an initial quantization matrix $Q_0$, including a plurality of quantizers $q_0$. Each such quantizer $q_1$ is computed in accordance with the equation:

$$q_1 = \begin{cases} q_0, & \text{if } k = 0; \\ kq_0, & \text{if } k > 0. \end{cases}$$

A JPEG image is recompressed using the new quantization matrix $Q_1$ while rounding each half integer value towards zero.

A further embodiment provides a system and method for recompressing a JPEG image using requantization. A JPEG image is stored as compressed image data quantized per an initial quantization matrix $Q_0$, including a plurality of initial quantizers $q_0$. A target quantization matrix $Q_{bound}$, including a plurality of target quantizers $q_{bound}$, is defined. An intermediate constant k is computed in accordance with the equation:

$$k = \left\lfloor \frac{q_{bound}}{q_0} \right\rfloor.$$

A new quantization matrix $Q_1$ including a plurality of quantizers $q_1$ is constructed from the initial quantization matrix $Q_0$ by computing each such quantizer $q_1$ in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases}$$

The compressed image data is requantized using the new quantization matrix $Q_1$.

A further embodiment provides a system and method for recompressing a JPEG image using requantization with selective rounding. A JPEG image is stored as compressed image data quantized per an initial quantization matrix $Q_0$ including a plurality of initial quantizers $q_0$. A target quantization matrix $Q_{bound}$, including a plurality of target quantizers $q_{bound}$, is defined. An intermediate constant k is computed in accordance with the equation:

$$k = \left\lfloor \frac{q_{bound}}{q_0} \right\rfloor.$$

A new quantization matrix $Q_1$ including a plurality of quantizers $q_1$ is constructed from the initial quantization matrix $Q_0$ by computing each such quantizer $q_1$ in accordance with the equation:

$$q_1 = \begin{cases} q_0, & \text{if } k = 0; \\ kq_0, & \text{if } k > 0. \end{cases}$$

The compressed image data is recompressed using the new quantization matrix $Q_1$ by rounding each half integer value towards zero.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The file of this patent contains three color drawings. Copies of this patent with the color drawings will be provided by the Patent and Trademark Office upon request and payment of the necessary fee.

DETAILED DESCRIPTION

Figure 1:
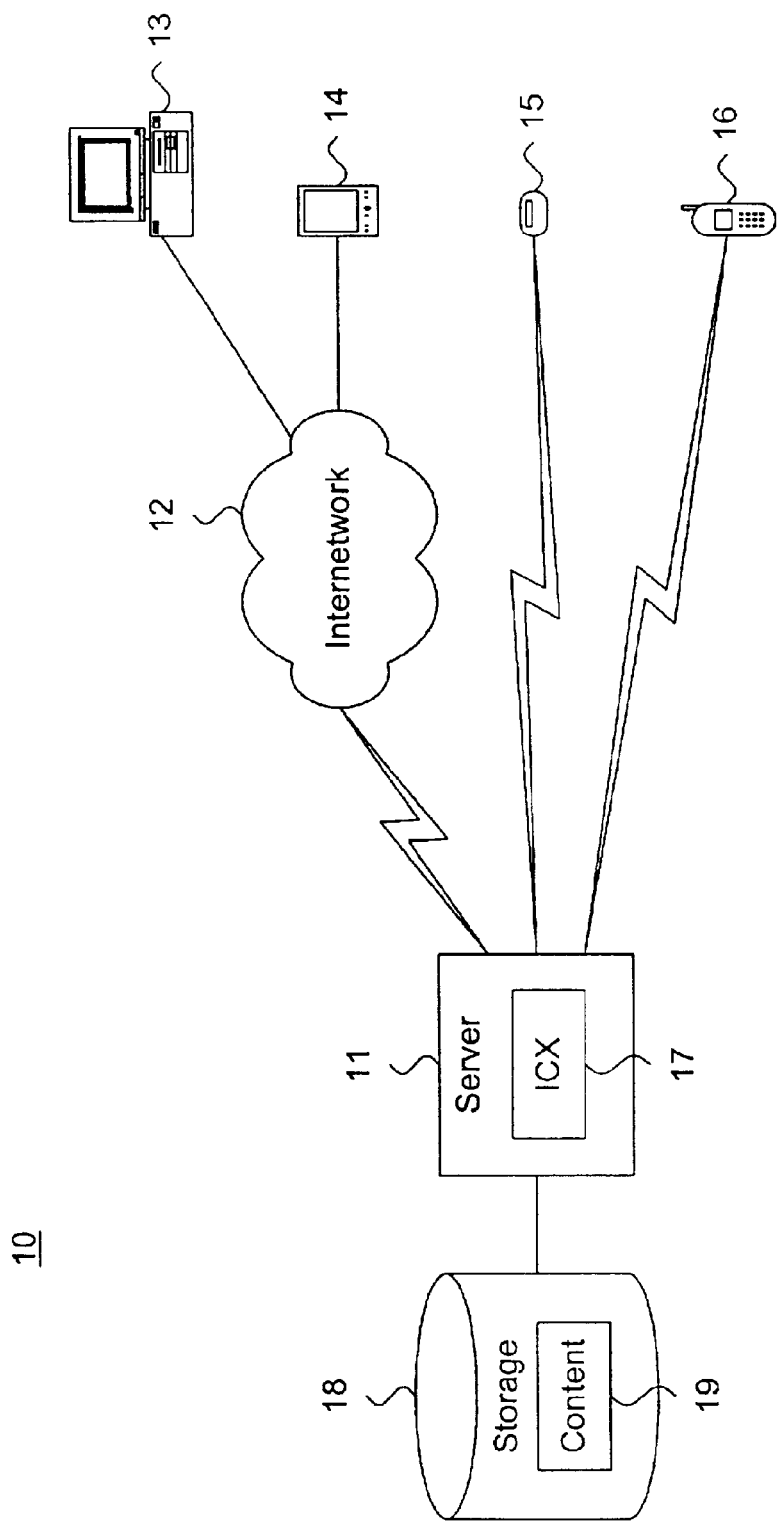
FIG. 1 is a functional block diagram showing a distributed computing environment, including a system for recompressing a JPEG image using requantization, in accordance with the present invention.

FIG. 1 is a functional block diagram 10 showing a distributed computing environment, including a system for recompressing a JPEG image using requantization, in accordance with the present invention. By way of example, a server 11 serves content 19 maintained in a peripheral storage device 18 to a plurality of interconnected devices. These devices include a computer system 13 and a personal data assistant (PDA) 14, interconnected over an internetwork 12, including the Internet. These devices can also include a pager 15 or cellular telephone 16, respectively interconnected via short messaging service and telephony servers (not shown). Other types of devices, as well as network topologies and configurations, are possible, as would be recognized by one skilled in the art.

The server 11 includes an Internet content accelerator (ICX) 17 that optimizes and accelerates the serving of the content 19 to the various devices 13–16. The capabilities to receive content 19 depend greatly upon the type of device and bandwidth available to the interconnection. PDAs 14, pagers 15, and cellular telephones 16 typically have limited storage and display capabilities. These types of devices may not be capable of receiving larger digital images for storage and display. Similarly, low-bandwidth connections might be prohibitively slow and impractical for serving the larger digital images.

To address the issue of delivering the content 19, and in particular, digital images to limited-capability clients and over low-bandwidth connections, the Internet content accelerator 17 analyzes the data and optimizes and accelerates the transmission to the various devices 13–16. In the described embodiment, an Internet content accelerator 17 suitable for use in the present invention is the Appcelera product running the PacketWise software suite, sold and licensed by Packeteer Inc., Cupertino, Calif. One approach to addressing the low bandwidth problem is to re-compress data and, in particular, digital images, to decrease the size of the files being sent to requesting clients 13–16. The standard file format for storing photo-realistic images is the JPEG file format, such as described in Joint Photographic Experts Group, *Various documents and links*, http://www.ipeg.org; W. B. Pennebaker et al., "JPEG Still Image Data Compression Standard," Van Nostrad Rhinehold (1993); J. Miano, "Compressed Image File Formats: JPEG, PNG, JIF, XBM, BMP," ACM Press (1999); and D. Hankerson et al., "Introduction to Information Technology and Data Compression," *http://www.dms.aubum.edu/compressionldownload.html*, the disclosures of which are incorporated by reference. The properties of the JPEG file format can be used to address the problem of converting the content 19 into a form suitable for low bandwidth connections.

Figure 2A:
FIGS. 2A–C show, by way of example, JPEG images compressed to quality levels Q75, Q50, and Q48, respectively.
Figure 2B:

Blindly recompressing a JPEG image using an arbitrary new quantization matrix can result in the creation of undesirable visual artifacts in the recompressed image. For instance, FIG. 2A shows, by way of example, a JPEG image compressed to quality level IJG Q75. Similarly, FIG. 2B shows, by way of example, the same JPEG image of FIG. 2A recompressed to quality level IJG Q50. The resulting image is 17% smaller but has considerable visual artifacts and appears much grainier than the original JPEG image of FIG. 2A.

Figure 2C:

Contrary to intuition, the visual quality of the recompressed image can be improved by decreasing the quality level. FIG. 2C shows, by way of example, the same JPEG image of FIG. 2A recompressed to a quality level Q48. The grainy artifacts from the quality level Q50 image of FIG. 2B are absent. The quality level Q48 image of FIG. 2C is perceptually much closer to the original image of FIG. 2A and is 37% smaller in file size. The counter-intuition that visual quality can be improved by recompressing to a smaller quality level is observed and discussed in S. Chan, infra. As described therein, the crucial properties of perceptually improving visual quality through decreasing the quality level are the entry-wise quotients of the quantization matrices and the types of error made when recompressing the original image a second time.

Figure 3:
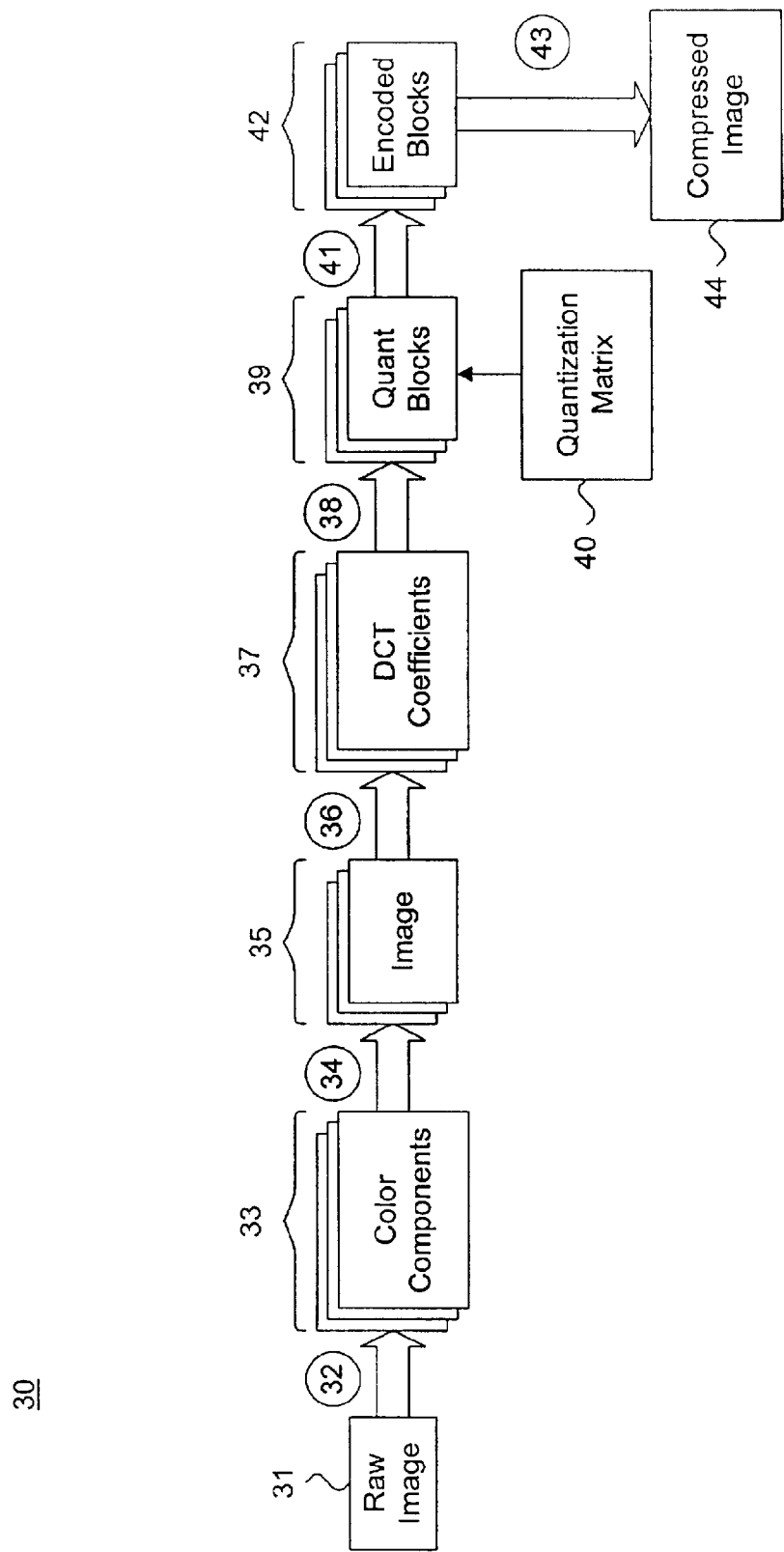
FIG. 3 is a process flow diagram showing the prior art operations performed to generate a compressed JPEG image.

FIG. 3 is a process flow diagram showing the prior art operations 30 performed to generate a compressed JPEG image. A raw digital image 31 comprising a two-dimensional matrix of pixel values indicating color values and locations is stored on a storage device 18 (shown in FIG. 1). Alternatively, the raw image 31 could be a grayscale image with each pixel value representing a tonal value of gray for rendering a black and white image. For purposes of illustration, operations performed on color images are described herein, although one skilled in the art would recognize that a grayscale image could likewise be processed as a color image having a single component.

The raw image 31 is separated (transition 32) into three color components 33 which are then individually processed. In the described embodiment, the color components 33 include Luma Y' and Chrominance Red/Blue $C_B$ $C_R$. However, the color components 33 can also represent Red/Green/Blue RGB or other color coding schemes. In turn, each color component 33 is partitioned (transition 34) into non-overlapping 8-by-8 blocks 35, using padding if necessary. Each block 35 is transformed (transition 36) into two-dimensional Discrete Cosine Transformation (DCT) blocks 37.

Next, each transformed DCT block 37 is quantized (transition 38) with respect to an 8-by-8 quantization matrix 40. Note the quantization matrix 40 can be chosen freely for all three color components 33.

The resulting quantized blocks 39 are encoded (transition 41) into encoded blocks 42 representing compressed data that is then stored (transition 43) as the compressed image 44. In the described embodiment, Huffman or arithmetic coding can be employed to encode the quantized blocks 39. Subsequently, each compressed image 44 can be, after decompression, which is the inverse operation of compression, recompressed to a new quality level thereby saving file space and lowering the bandwidth required to download each recompressed image.

Figure 4:
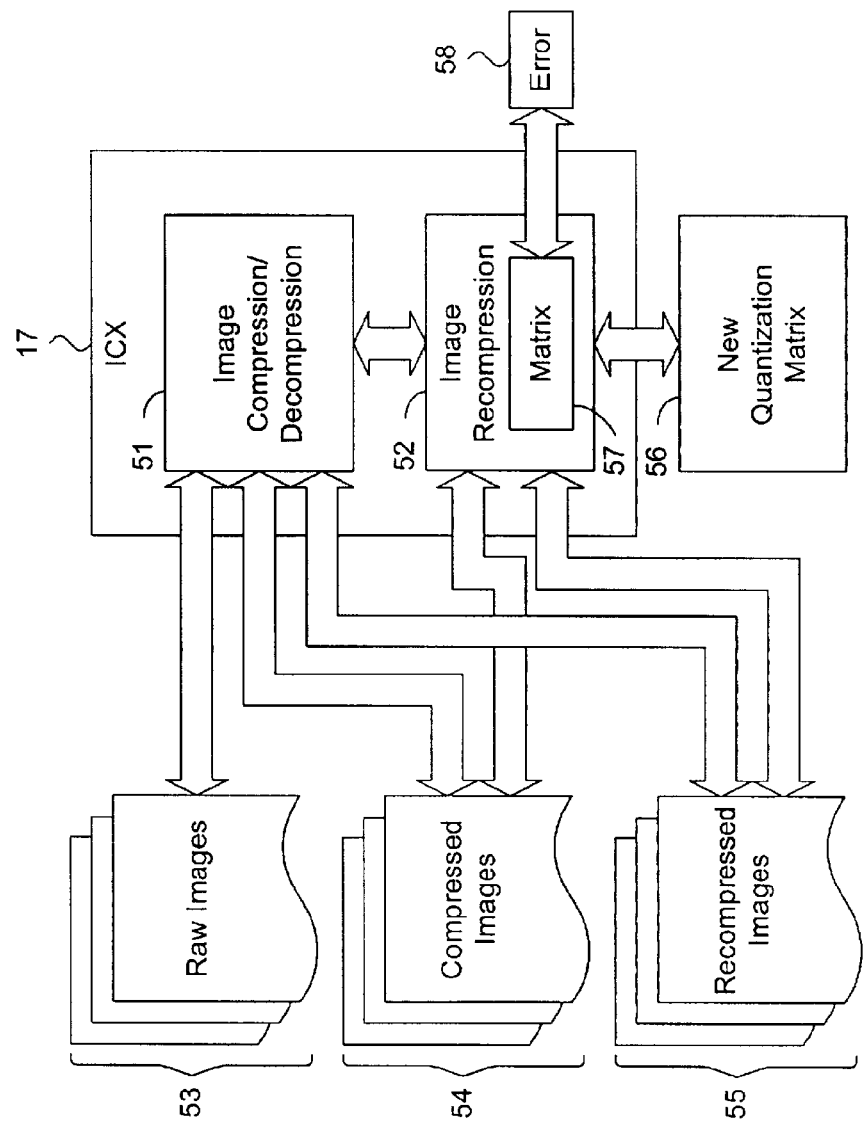
FIG. 4 is a block diagram showing the system for recompressing JPEG images using the requantization of FIG. 1.

FIG. 4 is a block diagram showing the system 50 for recompressing JPEG images using the system of FIG. 1. The system 50, through the Internet content accelerator (ICX) 17, recompresses JPEG images by constructing a new quantization matrix 56 which is then used to recompress each compressed JPEG image to a new (and more space efficient) image quality level, determined by the given quantization matrix and the desired target quantization matrix, which serves as a bound. The Internet content accelerator 17 includes two modules: image compression/decompression 51, and image recompression 52. One skilled in the art would recognize that the Internet content accelerator 17 includes further modules for selecting content 19 (shown in FIG. 1) and determining an appropriate optimization and acceleration strategy. These modules have been omitted for clarity and brevity of discussion herein.

The image compression/decompression module 51 performs standard JPEG image compression and decompression, such as described above with reference to FIG. 3. Raw images 53 and compressed images 54 are retrieved and respectively compressed and uncompressed into compressed images 54 and raw images 53. The raw images 53 are preferably compressed to a predetermined or user-defined quality level.

The image recompression module 52 recompresses both compressed images 54 and recompressed images 55 into recompressed images 55. Although a compressed image 54 or recompressed image 55 may be recompressed, the actual recompressed image 55 is merely a compressed image that has been requantized using the new quantization matrix 56 to a preferably lower quality level, as further described below with reference to FIG. 5.

The image recompression module 52 includes a matrix module 57 for statistically analyzing DCT transform coefficients for compressed JPEG images 54 to generate a stored numeric error representation 58. Local minimizers are determined from the stored numeric error representation 58 with selective rounding convention and a new quantization matrix $Q_1$ is selected from the local minimizers bounded by a target quantization matrix $Q_{bound}$. The new quantization matrix $Q_1$ can be used to form the recompressed JPEG images 55.

Referring back to FIG. 3, the DCT coefficients 37 represent the spatial frequency components of each image block 35 and are arranged such that the coefficient in the upper left hand corner is the DC coefficient which measures the energy of the zero frequency term. The remaining 63 coefficients are the AC coefficients, which represent the strengths of the components with increasingly horizontal frequency from left to right and increasing vertical frequency from top to bottom. Each of the 64 DCT coefficients is quantized using one of 64 corresponding values from the quantization matrix 40.

An example of a quantization table 40 suitable for use in compressing a raw image is provided in the JPEG specification and includes a set of quantizers that makes use of the human visual frequency response property to allow higher frequency components to be quantized to a greater extent than the lower frequency components. The quantization matrix 40 can be modified to recompress a compressed JPEG image to afford a higher level of quantization and hence lower visual quality level. In turn, a lower visual quality level decreases the size of the resultant image file and lowers the bandwidth needed for download.

Figure 5:
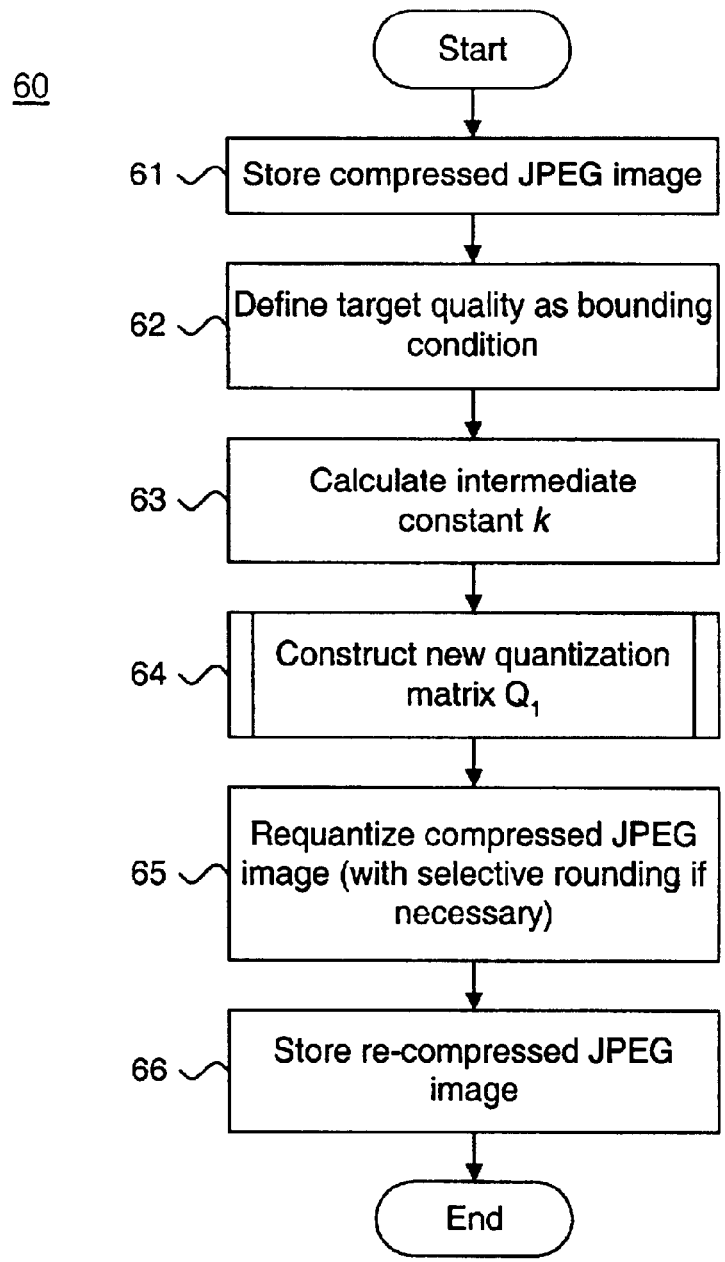
FIG. 5 is a flow diagram showing a method for recompressing a JPEG image using requantization, in accordance with the present invention.

FIG. 5 is a flow diagram showing a method 60 for recompressing a JPEG image using requantization, in accordance with the present invention. Briefly, the purpose of this method is to construct a new quantization matrix $Q_1$, given a compressed JPEG image and a target quantization matrix $Q_{bound}$, and then to requantize the given image at a different and preferably lower and more space efficient quality level. The goal is to avoid the "grainy" artifacts, as in FIG. 2B, and to seek "smooth" artifacts, as in FIG. 2C, instead.

Thus, a compressed JPEG image 54 (shown in FIG. 4) is stored (block 61) into a storage device 18 (shown in FIG. 1) or computer memory. A target quantization matrix $Q_{bound}$ with entries $q_{bound}$ is specified as a bounding condition (block 62) on the resultant recompressed image 55, with a new quantization matrix $Q_1$, with entries $q_1$ which are yet to be determined. Depending on the parity of an intermediate constant, each of the quantizers $q_1$ in the new quantization matrix $Q_1$ either is an integer multiple of the corresponding quantizer $q_0$ in the original quantization matrix $Q_0$ or is an integer multiple of the corresponding quantizer $q_0$ incremented by 1.

An intermediate constant k (block 63) serving as the integer multiplier is calculated using equation (1), as follows:

$$k = \left\lfloor \frac{q_{bound}}{q_0} \right\rfloor. \quad (1)$$

Next, the corresponding entry $q_1$ of the new quantization matrix $Q_1$ (block 64) is computed, using the intermediate constant k, as further described below with reference to FIGS. 7 and 8. Use of these operations will cause a desired decrease in amplitude.

The compressed JPEG image 54 is then requantized using the new quantization matrix $Q_1$ (block 65). As further described below with reference to FIG. 8, the quantized values are calculated subject to a modified rounding convention when using a new quantization matrix $Q_1$ as constructed therein. Finally, the recompressed JPEG image 55 is stored (block 66) into a storage device 18 or computer memory. The method then terminates.

Figure 6:
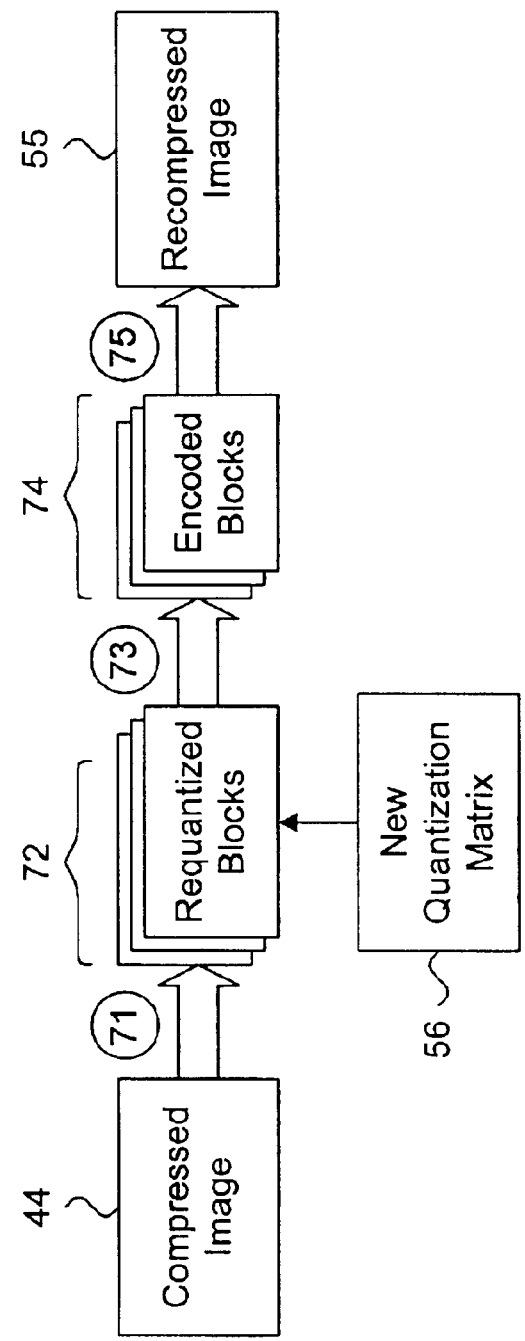
FIG. 6 is a process flow diagram showing the operations performed to recompress a compressed JPEG image using the method of FIG. 4.

FIG. 6 is a process flow diagram showing the operations 70 performed to recompress a compressed JPEG image using the method of FIG. 5. Quantized blocks (not shown) are retrieved from the compressed image 44 and requantized (transition 71) using the new quantization matrix 56 to generate the requantized blocks 72. The requantized blocks 72 are then encoded (transition 73) into encoded blocks 74 which are then stored (transition 75) as the recompressed image 55. In the described embodiment, the new quantization matrix is constructed using one of two sets of operations, as described below with reference to FIGS. 7 and 8.

Figure 7:
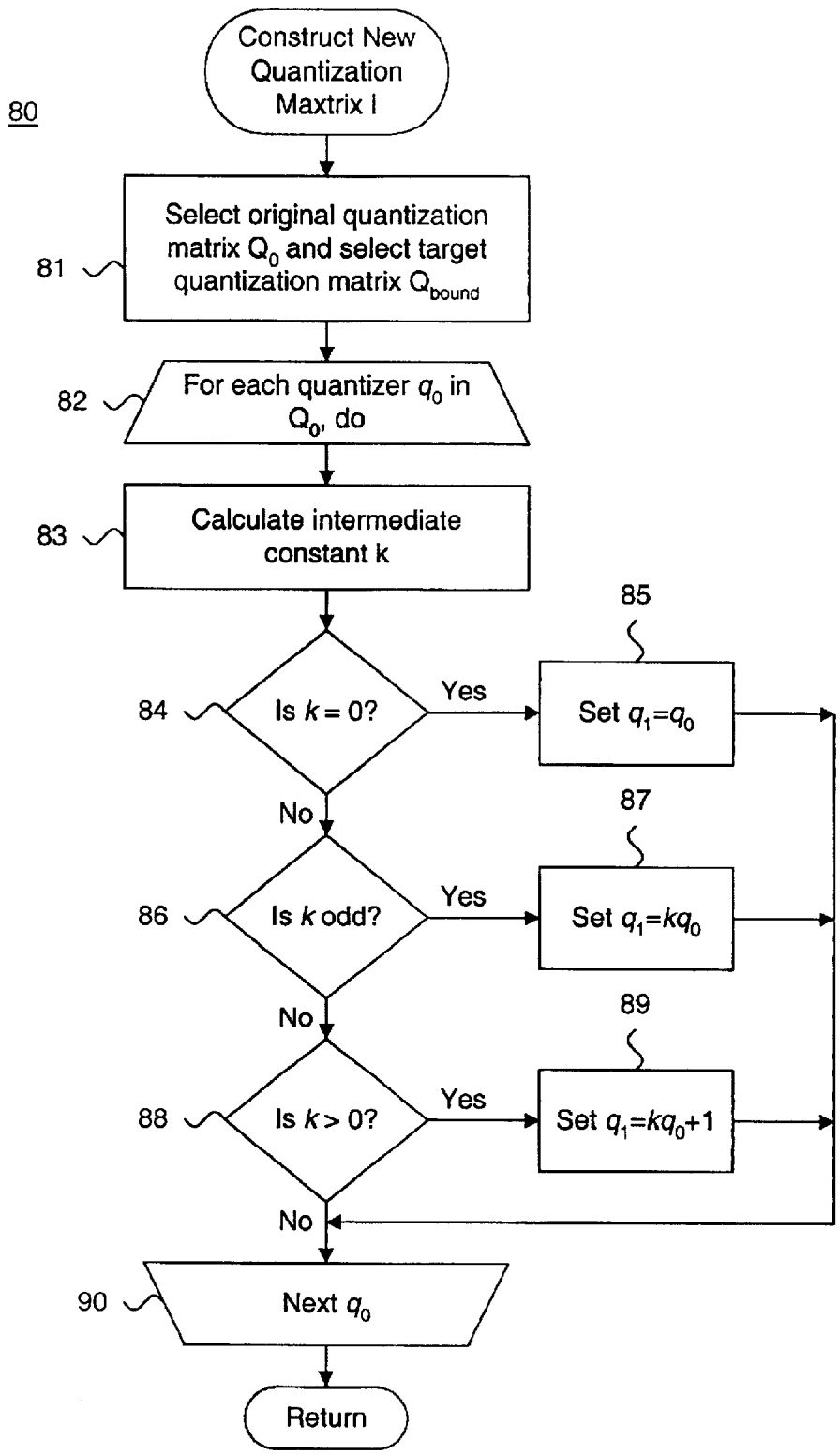
FIG. 7 is a flow diagram showing the routine for constructing a new quantization matrix for use in the method of FIG. 5.

FIG. 7 is a flow diagram showing the routine 80 for constructing a new quantization matrix (shown in FIG. 6) for use in the method of FIG. 5. The purpose of this routine is to multiply the quantizers $q_0$ in the original quantization matrix $Q_0$ by the intermediate constants k, computed by equation (1) above, to generate subsequently the quantizers $q_1$ of the new quantization matrix $Q_1$, as follows.

The original quantization matrix $Q_0$ is obtained(block 81) and each individual quantizer $q_0$ is iteratively processed in a processing loop (blocks 82–90). During each iteration (block 82), a new quantizer $q_1$ is computed according to equation (2) as follows:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even}. \end{cases} \quad (2)$$

where $q_0$ and $q_1$ are quantizers in the original and new quantization matrices $Q_0$ and $Q_1$, respectively; and k is the intermediate constant calculated according to equation (1), above (block 83).

If the intermediate constant k equals zero (block 84), the new quantizer $q_1$ equals the original quantizer $q_0$ (block 85). Otherwise, if the intermediate constant k is an odd number (block 86), the new quantizer $q_1$ is equal to the product of the intermediate constant k and the original quantizer $q_0$ (block 87). Otherwise, if the intermediate constant k is even and greater than zero (block 88), the new quantizer $q_1$ is equal to the product of the intermediate constant k times the original quantizer $q_0$ plus one (block 89). Processing of each quantizer $q_0$ in the original quantization matrix $Q_0$ continues (block 90) until all quantizers $q_0$ have been processed. The routine then returns.

The foregoing operations are performed on each of the 64 frequencies of the color components 33 (shown in FIG. 3) to obtain the new quantization matrix $Q_1$.

Figure 8:
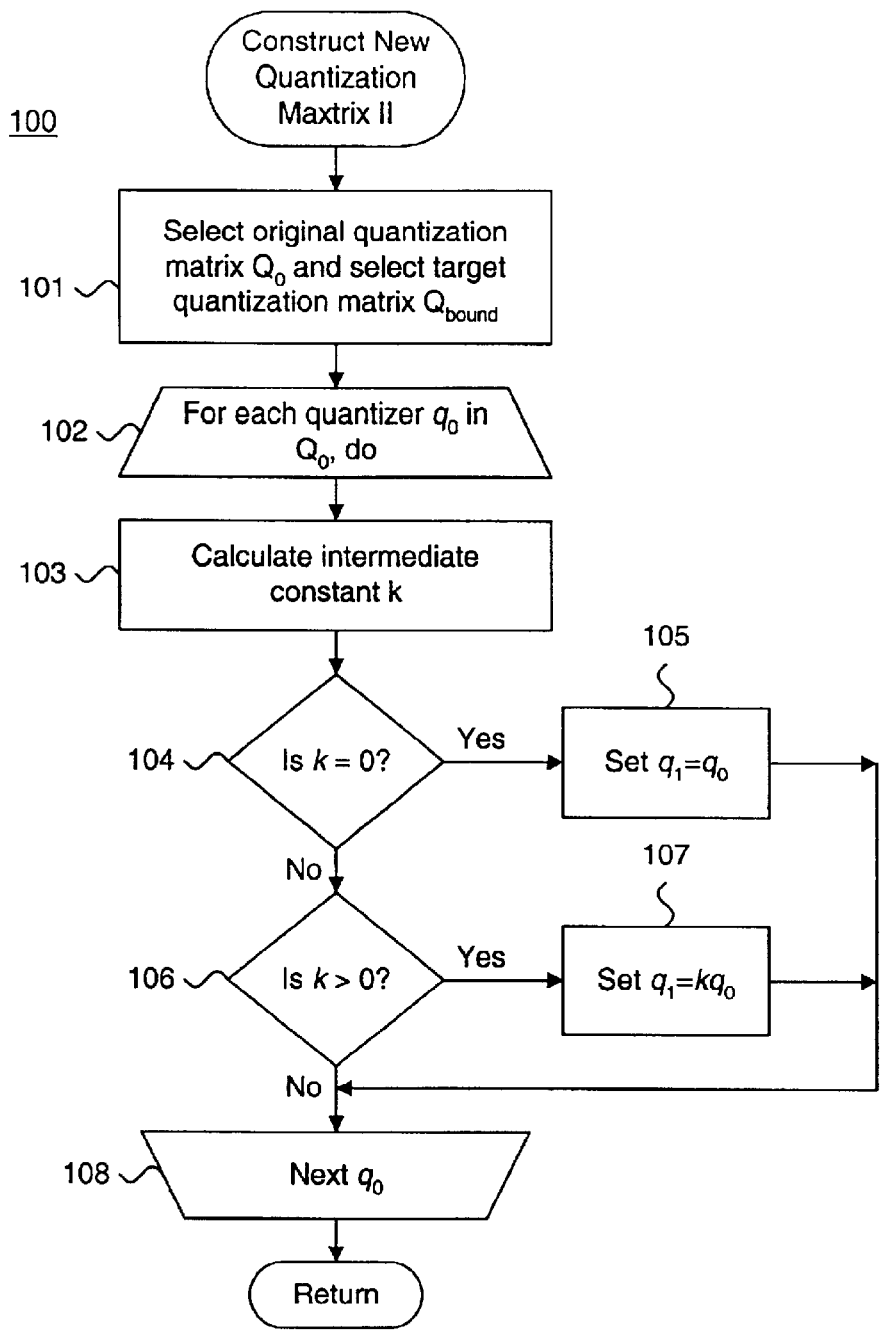
FIG. 8 is a flow diagram showing the routine for constructing a new quantization matrix, as a further embodiment, for use in the method of FIG. 5.

FIG. 8 is a flow diagram showing the routine 100 for constructing a new quantization matrix 56, as a further embodiment, for use in the method of FIG. 5. The purpose of this routine is also to create a new quantization matrix 56, which is subsequently used in conjunction with a modified rounding convention during requantization (block 65 in FIG. 5).

Thus, the original quantization matrix $Q_0$ is obtained (block 101) and each individual quantizer $q_0$ is iteratively processed in a processing loop (blocks 102–108). During each iteration (block 102), a new quantizer $q_1$ is computed according to equation (3) as follows:

$$q_1 = \begin{cases} q_0, & \text{if } k = 0; \\ kq_0, & \text{if } k > 0. \end{cases} \quad (3)$$

where $q_0$ and $q_1$ are quantizers in the original and new quantization matrices $Q_0$ and $Q_1$, respectively; and k is the intermediate constant calculated according to equation (1), above (block 103).

If the intermediate constant k equals zero (block 104), the new quantizer $q_1$ equals the original quantizer $q_0$ (block 105). Otherwise, if the intermediate constant k is greater than zero (block 106), the new quantizer $q_1$ equals the product of the intermediate constant k times the original quantizer $q_0$ (block 107). Processing of each quantizer $q_0$ in the original quantization matrix $Q_0$ continues (block 108) until all quantizers have $q_0$ have been processed. The routine then returns.

Although the foregoing operations only require the selection between two cases (k equals zero, or k is greater than zero), the actual requantization of the compressed JPEG image (block 65 in FIG. 5) must be modified to use a rounding convention, as follows: round the quotients potentially occurring during requantization to the nearest integer, with the exception that round half integers (½, ³⁄₂, ...) are rounded towards zero.

As would be recognized by one skilled in the art, the specific equations (2) and (3) for forming a new quantization matrix $Q_1$ from individual quantizers $q_1$ are illustrative of a more generalized approach to forming a new quantization matrix $Q_1$ by using statistical error analysis from individual quantizers $q_1$ and a given target quality quantization matrix $Q_{bound}$.

As is known in the art, the DCT transform coefficients follow approximately a Laplacian distribution for every frequency. See, e.g., R. C. Reininger et al., "Distributions of the Two-Dimensional DCT Coefficients for Images," IEEE Trans. on Comm., Vol. COM-31, No. 6, pp. 835–839 (June 1983) and E. Y. Lam et al., "A Mathematical Analysis of the DCT Coefficient Distributions for Images," IEEE Trans. on Image Proc., Vol. 9, No. 10, pp. 1661–1666 (October 2000). The effect of quantizing a Laplacian distribution twice, which corresponds to recompressing an already compressed JPEG image, results in statistically analyzable error. More particularly, for certain error measures and rounding conventions, the statistical error generated while twice quantizing a Laplacian distribution has a local minimum when the second quantizer is determined as in equations (2) and (3), respectively.

Accordingly, a statistical error analysis can be used to determine a numeric representation of DCT transform coefficients for a given compressed JPEG image. Local minimizers can be determined from the error function with selective rounding. The local minimizers can be used to select a new quantization matrix $Q_1$ for recompressing a given JPEG image, subject to the bounding constraints imposed by the target quantization matrix $Q_{bound}$.

As well, the JPEG standard is closely related to other forms of photo-realistic digital imagery and audio technologies, including the compression, decompression, processing, and coded representation standards of moving pictures, audio and their combination, as specified by the Moving Pictures Experts Group (MPEG), ISO JTC1/SC29 WG 11. One skilled in the art would recognize the applicability of the foregoing requantization techniques and obvious variations thereof on the various MPEG standards.

While the invention has been particularly shown and described as referenced to the embodiments thereof, those skilled in the art will understand that the foregoing and other changes in form and detail may be made therein without departing from the spirit and scope of the invention.

What is claimed is:

1. A system for recompressing a JPEG image using requantization, comprising:

a matrix module statistically analyzing DCT transform coefficients for a compressed JPEG image to generate a stored numeric error representation, determining local minimizers from the stored numeric error representation with selective rounding, and selecting a new quantization matrix $Q_1$ from the local minimizers bounded by a target quantization matrix $Q_{bound}$; and an image recompression module recompressing the compressed JPEG image using the new quantization matrix $Q_1$.

2. A method for recompressing a JPEG image using requantization, comprising:

statistically analyzing DCT transform coefficients for a compressed JPEG image to generate a stored numeric error representation;

determining local minimizers from the stored numeric error representation with selective rounding;

selecting a new quantization matrix $Q_1$ from the local minimizers bounded by a target quantization matrix $Q_{bound}$; and recompressing the compressed JPEG image using the new quantization matrix $Q_1$.

3. A system for constructing a new quantization matrix for use in recompressing a JPEG image, comprising:

an intermediate constant module determining an intermediate constant k computed in accordance with the equation:

$$k = \left\lfloor \frac{q_{bound}}{q_0} \right\rfloor;$$

a matrix module defining a new quantization matrix $Q_1$, comprising a plurality of quantizers $q_1$, from an initial quantization matrix $Q_0$, comprising a plurality of quantizers $q_0$, each such quantizer $q_1$ computed in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases} \text{; and}$$

a recompression module recompressing a JPEG image using the new quantization matrix $Q_1$.

4. A system according to claim 3, further comprising:

a compression module compressing the JPEG image using a lossy JPEG compression mode.

5. A method for constructing a new quantization matrix for use in recompressing a JPEG image, comprising:

determining an intermediate constant k computed in accordance with the equation:

$$k = \left\lfloor \frac{q_{bound}}{q_0} \right\rfloor;$$

defining a new quantization matrix $Q_1$, comprising a plurality of quantizers $q_1$, from an initial quantization matrix $Q_0$, comprising a plurality of quantizers $q_0$, each such quantizer $q_1$ computed in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases} \text{; and}$$

recompressing a JPEG image using the new quantization matrix $Q_1$.

6. A method according to claim 5, further comprising:

compressing the JPEG image using a lossy JPEG compression mode.

7. A system for constructing a new quantization matrix for use in recompressing a JPEG image with selective rounding, comprising:

an intermediate constant module determining an intermediate constant k computed in accordance with the equation:

$$k = \left\lfloor \frac{q_{bound}}{q_0} \right\rfloor;$$

a matrix module defining a new quantization matrix $Q_1$, comprising a plurality of quantizers $q_1$, from an initial quantization matrix $Q_0$, comprising a plurality of quantizers $q_0$, each such quantizer $q_1$ computed in accordance with the equation:

$$q_1 = \begin{cases} q_0, & \text{if } k = 0; \\ kq_0, & \text{if } k > 0. \end{cases} ; \text{ and}$$

a recompression module recompressing a JPEG image using the new quantization matrix $Q_1$ while rounding each half integer value towards zero.

8. A system according to claim 7, further comprising:

a compression module compressing the JPEG image using a lossy JPEG compression mode.

9. A method for constructing a new quantization matrix for use in recompressing a JPEG image with selective rounding, comprising:

determining an intermediate constant k computed in accordance with the equation:

$$k = \left\lfloor \frac{q_{bound}}{q_0} \right\rfloor;$$

defining a new quantization matrix $Q_1$, comprising a plurality of quantizers $q_1$, from an initial quantization matrix $Q_0$, comprising a plurality of quantizers $q_0$, each such quantizer $q_1$ computed in accordance with the equation:

$$q_1 = \begin{cases} q_0, & \text{if } k = 0; \\ kq_0, & \text{if } k > 0. \end{cases} ; \text{ and}$$

recompressing a JPEG image using the new quantization matrix $Q_1$ while rounding each half integer value towards zero.

10. A method according to claim 9, further comprising:

compressing the JPEG image using a lossy JPEG compression mode.

11. A system for recompressing a JPEG image using requantization, comprising:

a JPEG image stored as compressed image data quantized per an initial quantization matrix $Q_0$ comprising a plurality of initial quantizers $q_0$;

a quantization matrix generator defining a target quantization matrix $Q_{bound}$ comprising a plurality of target quantizers $q_{bound}$, computing an intermediate constant k in accordance with the equation:

$$k = \left\lfloor \frac{q_{bound}}{q_0} \right\rfloor,$$

and constructing a new quantization matrix $Q_1$ comprising a plurality of quantizers $q_1$ from the initial quantization matrix $Q_0$ by computing each such quantizer $q_1$ in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases} ; \text{ and}$$

an image recompression module requantizing the compressed image data using the new quantization matrix $Q_1$.

12. A system according to claim 11, wherein the JPEG image comprises a color image, further comprising:

a component separation submodule separating the color image into separate color components; and a quantization submodule requantizing each such color component using the new quantization matrix $Q_1$.

13. A system according to claim 11, wherein the JPEG image comprises a grayscale image, further comprising:

a quantization submodule requantizing the grayscale image using the new quantization matrix $Q_1$.

14. A system according to claim 11, further comprising:

a partition submodule partitioning the JPEG image;

a transformation submodule transforming each partition using a DCT; and a quantization submodule quantizing the transformed partitions using the quantization matrix $Q_0$.

15. A system according to claim 11, wherein the JPEG image is compressed using one of baseline sequential encoding and DCT-encoding.

16. A method for recompressing a JPEG image using requantization, comprising:

storing a JPEG image as compressed image data quantized per an initial quantization matrix $Q_0$ comprising a plurality of initial quantizers $q_0$;

defining a target quantization matrix $Q_{bound}$ comprising a plurality of target quantizers $q_{bound}$;

computing an intermediate constant k in accordance with the equation:

$$k = \left\lfloor \frac{q_{bound}}{q_0} \right\rfloor;$$

constructing a new quantization matrix $Q_1$ comprising a plurality of quantizers $q_1$ from the initial quantization matrix $Q_0$ by computing each such quantizer $q_1$ in accordance with the equation:

$$q_1 = \begin{cases} q_0, & \text{if } k = 0; \\ kq_0, & \text{if } k \text{ is odd}; \\ kq_0 + 1, & \text{if } k > 0 \text{ and } k \text{ is even.} \end{cases} ; \text{ and}$$

requantizing the compressed image data using the new quantization matrix $Q_1$.

17. A method according to claim 16, wherein the JPEG image comprises a color image, further comprising:

separating the color image into separate color components; and requantizing each such color component using the new quantization matrix $Q_1$.

18. A method according to claim 16, wherein the JPEG image comprises a grayscale image, further comprising:
   requantizing the grayscale image using the new quantization matrix $Q_1$.

19. A method according to claim 16, further comprising:
   partitioning the JPEG image;
   transforming each partition using a DCT; and
   quantizing the transformed partitions using the quantization matrix $Q_0$.

20. A method according to claim 16, wherein the JPEG image is compressed using one of baseline sequential encoding and DCT-encoding.

21. A system for recompressing a JPEG image using requantization with selective rounding, comprising:
   a JPEG image stored as compressed image data quantized per an initial quantization matrix $Q_0$ comprising a plurality of initial quantizers $q_0$;
   a quantization matrix generator defining a target quantization matrix $Q_{bound}$ comprising a plurality of target quantizers $q_{bound}$, computing an intermediate constant k in accordance with the equation:

$$k = \left\lfloor \frac{q_{bound}}{q_0} \right\rfloor;$$

and constructing a new quantization matrix $Q_1$ comprising a plurality of quantizers $q_1$ from the initial quantization matrix $Q_0$ by computing each such quantizer $q_1$ in accordance with the equation:

$$q_1 = \begin{cases} q_0, & \text{if } k = 0; \\ kq_0, & \text{if } k > 0. \end{cases} ; \text{ and}$$

an image recompression module requantizing the compressed image data using the new quantization matrix $Q_1$ by rounding each half integer value towards zero.

22. A system according to claim 21, wherein the JPEG image comprises a color image, further comprising:
   a component separation submodule separating the color image into separate color components; and
   a quantization submodule requantizing each such color component using the new quantization matrix $Q_1$.

23. A system according to claim 21, wherein the JPEG image comprises a grayscale image, further comprising:
   a quantization submodule requantizing the grayscale image using the new quantization matrix $Q_1$.

24. A system according to claim 21, further comprising:
   a partition submodule partitioning the JPEG image;
   a transformation submodule transforming each partition using a DCT; and
   a quantization submodule quantizing the transformed partitions using the quantization matrix $Q_0$.

25. A system according to claim 21, wherein the JPEG image is compressed using one of baseline sequential encoding and DCT-encoding.

26. A method for recompressing a JPEG image using requantization with selective rounding, comprising:
   storing a JPEG image as compressed image data quantized per an initial quantization matrix $Q_0$ comprising a plurality of initial quantizers $q_0$;
   defining a target quantization matrix $Q_{bound}$ comprising a plurality of target quantizers $q_{bound}$;
   computing an intermediate constant k in accordance with the equation:

$$k = \left\lfloor \frac{q_{bound}}{q_0} \right\rfloor;$$

constructing a new quantization matrix $Q_1$ comprising a plurality of quantizers $q_1$ from the initial quantization matrix $Q_0$ by computing each such quantizer $q_1$ in accordance with the equation:

$$q_1 = \begin{cases} q_0, & \text{if } k = 0; \\ kq_0, & \text{if } k > 0. \end{cases} ; \text{ and}$$

requantizing the compressed image data using the new quantization matrix $Q_1$ by rounding each half integer value towards zero.

27. A method according to claim 26, wherein the JPEG image comprises a color image, further comprising:
   separating the color image into separate color components; and
   requantizing each such color component using the new quantization matrix $Q_1$.

28. A method according to claim 26, wherein the JPEG image comprises a grayscale image, further comprising:
   requantizing the grayscale image using the new quantization matrix $Q_1$.

29. A method according to claim 26, further comprising:
   partitioning the JPEG image;
   transforming each partition using a DCT; and
   quantizing the transformed partitions using the quantization matrix $Q_0$.

30. A method according to claim 26, wherein the JPEG image is compressed using one of baseline sequential encoding and DCT-encoding.

* * * * *